United States Patent
Cheng et al.

(10) Patent No.: US 7,272,113 B2
(45) Date of Patent: Sep. 18, 2007

(54) APPARATUS, AND ASSOCIATED METHOD, FOR COMMUNICATING FRAME-FORMATTED DATA AT A SELECTED QOS LEVEL IN A RADIO COMMUNICATION SYSTEM

(75) Inventors: Mark W. Cheng, San Diego, CA (US); Liangchi Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1030 days.

(21) Appl. No.: 10/308,921

(22) Filed: Dec. 3, 2002

(65) Prior Publication Data

US 2003/0133408 A1 Jul. 17, 2003

Related U.S. Application Data

(60) Provisional application No. 60/338,336, filed on Dec. 5, 2001.

(51) Int. Cl.
*H04L 1/18* (2006.01)
(52) U.S. Cl. .................. 370/231; 370/468; 714/749
(58) Field of Classification Search ........... 370/230; 714/748, 750
See application file for complete search history.

(56) References Cited

U.S. PATENT DOCUMENTS

| 6,628,629 | B1* | 9/2003 | Jorgensen | 370/322 |
| 6,865,609 | B1* | 3/2005 | Gubbi et al. | 709/230 |
| 7,032,153 | B1* | 4/2006 | Zhang et al. | 714/749 |
| 2002/0061007 | A1* | 5/2002 | Pankaj | 370/342 |
| 2002/0172192 | A1* | 11/2002 | Hunzinger et al. | 370/352 |
| 2006/0007871 | A1* | 1/2006 | Welin | 370/252 |

* cited by examiner

*Primary Examiner*—Chi Pham
*Assistant Examiner*—Kevin Mew
(74) *Attorney, Agent, or Firm*—Alston & Bird LLP

(57) ABSTRACT

Apparatus, and an associated method, for enhancing VoIP communication services at a selected QoS level in a radio communication system. Apparatus is embodied at a MAC (Medium Access Control) layer of the communication system by which selectably to cause retransmission and re-ordering of data communicated pursuant to effectuation of the communication service. A service request generator generates a service request that requests initiation the communication service in which data retransmission is effectuated at the MAC layer. And, a buffer is utilized at the MAC layer at which data is re-ordered, if necessary, to place the data in form for delivery to higher logical layers defined in the communication system.

16 Claims, 4 Drawing Sheets

APPARATUS, AND ASSOCIATED METHOD, FOR COMMUNICATING FRAME-FORMATTED DATA AT A SELECTED QOS LEVEL IN A RADIO COMMUNICATION SYSTEM

CROSS REFERENCE TO RELATED APPLICATIONS

The present invention claims the priority of provisional patent application No. 60/338,336, filed on Dec. 5, 2001.

The present invention relates generally to the communication of frame-formatted data in a radio communication system, such as a 3G (Third-Generation) cellular communication system, in which the data is to be communicated at a selected QoS (Quality of Service) level. More particularly, the present invention relates to apparatus, and an associated method, that provides a data retransmission and data re-ordering scheme to facilitate effectuation of the data communications at the selected QoS level.

The data retransmission and re-ordering is provided at a lower logical layer, such as at the MAC (medium access control) and physical layers of the communication system. Requests for retransmission of data, and resultant retransmissions of the data, are made quickly, thereby to permit correction of frame errors without significantly increasing communication delay times. And, re-ordering of data, received out-of-sequence is performed at the lower-logical layer, e.g., at the MAC layer, so that the data is more likely to be passed, in proper order, to a higher logical layer. Re-sequencing of the data need not, therefore, be performed at the higher logical layers.

BACKGROUND OF THE INVENTION

A communication system provides for the communication of data between a sending station and a receiving station. The data is communicated between the sending and receiving stations by way of a communication channel that interconnects such stations. Data sourced at the sending station is converted into a form to permit its communication upon the communication channel. And, once delivered to the receiving station, recovery operations are performed upon the communicated data to recover the informational content thereof.

A radio communication system is an exemplary type of communication system. Communication channels defined in a radio communication system are defined upon radio links extending between the sending and receiving stations operable therein.

Because radio channels are utilized to communicate data between the sending and receiving stations, the need otherwise to install fixed, wireline connections to interconnect the sending and receiving stations, and to define communication channels thereon, is obviated. Therefore, infrastructure costs associated with the installation of a radio communication system are generally less than the corresponding infrastructure costs required to install the infrastructure of a wireline communication system. And, mobility can be provided to the communication stations operable in a radio communication system, thereby permitting mobile communications to be effectuated.

A cellular communication system is a type of radio communication system. Cellular communication systems have been installed throughout significant parts of the populated portions of the world. Cellular communication systems are constructed to be operable in compliance with operating specifications of any of various operating specifications.

A cellular communication system includes a network infrastructure that is installed throughout a geographical area that is to be encompassed by the communication system. The network infrastructure typically includes a plurality of fixed-site radio transceivers, referred to as base-transceiver stations, positioned at spaced-apart locations of the geographical area. Each of the base transceiver stations defines a region, referred to as a cell from which a cellular communication system derives its name.

Subscriber stations, usually referred to as mobile stations, positioned within the proximity of individual ones of the base transceiver stations are capable of communications therewith, thereby to permit effectuation of communication of data between the mobile station and a base transceiver station. Generally, a user of a mobile station is permitted access to the communication system to communicate therethrough through the purchase of a service subscription for service in the communication system.

Significant portions of the populated areas of the world are encompassed by cellular communication systems. Users are able to communicate telephonically when positioned in an area encompassed by the network part of a cellular communication system through the purchase of a service subscription for communication services in a system. Different systems, operated by different operators are sometimes overlayed in a single geographical area, providing a user with service selection between two or more separate systems. And, as technological advancements have permitted, successive generations of cellular communication systems have been developed and deployed. New systems that take advantage of new technological advancements are also under development, to be ready for future deployment.

Cellular communication systems are sometimes categorized by generational-type. That is, successive generations of cellular communication systems have been developed and deployed. The general timeline during which the systems are installed, and the technology available for inclusion in the system at the time at which the system initially was available for deployment, is divided into generations.

Systems that were first-installed are sometimes referred to as being of a first-generation (1G). First-generation systems generally make use of conventional, analog communication techniques utilizing frequency-division, multiple-access (FDMA) schemes. A system, referred to as an AMPS (Advanced Mobile Phone Service) system, is exemplary of a first-generation, cellular communication system.

Systems deployed subsequent to first-generation systems and that first incorporated digital communication techniques are sometimes referred to as being of a second-generation (2G). Such systems generally provide for, in addition to conventional voice communications, some data services. A system, referred to as an IS-95 (interim standard-95) system, is exemplary of a second-generation cellular communication system. An IS-95 system utilizes a code-division, multiple-access (CDMA) communication scheme.

Systems, generally related to corresponding 2G systems, but incorporating additional features, particularly improved data communication capabilities, permitted by evolutionary technological advancements, are sometimes referred to as being two-and-a-half generation (2.5G) systems. A cdma2000 system is exemplary of a 2.5 generation communication system.

And, so-called, third-generation (3G) systems are undergoing, or are anticipated to be undergoing, deployment.

These systems incorporate additional technological advancements and, generally provide for yet more-extensive data services than predecessor-generation systems. A 3GPP2 (third-generation partnership project two)-promulgated system, referred to as 1×EV-DV (1×Evolution for Data and Voice) is exemplary of a third-generation system predicated upon the cdma2000 system. And, HSDPA (High Speed Downlink Packet Access) in W-CDMA (Wideband-Code-Division, Multiple-Access) is a 3GPP-promulgated system, also exemplary of a third-generation system. These third-generation systems, as well as others, also differ with their 2G and 2.5G predecessors in that shared packet data channels, i.e., packet-switched channels, are to be used pursuant to certain data services.

In contrast, the predecessor systems generally utilize only circuit-switched, or otherwise dedicated, radio channels upon which to effectuate communications. The use of packet-switched channels permits the bandwidth allocated to the communication system to be utilized more efficiently. And, the communication capacity of a communication system that utilizes packet-switched communications is potentially significantly greater than the communication capacity of a corresponding system that utilizes only circuit-switched channels.

Voice over Internet Protocol (VoIP), or, more generally, Voice over Data (VoD), is a communication service that is anticipated to have significant use in mobile communications. Internet access is increasingly becoming ubiquitous, with increasing momentum. The aforementioned third-generation systems are intended to be capable of providing such VoD services.

Various technical issues remain, however. One technical challenge is to fulfill Quality of Service (QoS) requirements for VoIP services. A quality of service is a parameter that represents, according to one, or more, definitional criteria, a minimum service level at which a VoIP, or other, communication service is to be effectuated. The definitional criteria includes, for instance, delay times, error rates, or any other factor that might be determinative of, or have an affect on, the quality of the communication service. And, generally, Quality of Service refers to the ability to support an application requirement with regards to the categories, e.g., of bandwidth, delay, jitter, and traffic loss. The QoS parameters are managed based upon applications.

A subscriber to the communication system might, for instance, subscribe for service at a particular QoS level. For subscriptions at higher QoS levels, higher subscription fees, for instance, are charged by the operator of the communication system. And, in any event, maintenance of at least minimum QQS levels is required to ensure that the communication service is effectuated at least at a selected level. Also, different communication services are categorized differently. A VoIP service is generally prioritized as a highest-priority service. And, out of four defined traffic classes, a VoIP service is defined as conversational traffic that requires low delay and low data loss rates. A VoIP service is a real-time application that is sensitive to jitter.

To ensure that the voice quality level of a VoIP service is of an acceptable level, for instance, the bit error rate (BER) of the communicated frames, or packets, of data should be less than one percent. Maintenance of a frame quality is achieved, for instance by maintaining channel, albeit at the expense of capacity. Data retransmission is an alternative.

A VoIP service also requires the in-sequence delivery of compressed voice packets to maintain communication quality. It would be desirable to assure that voice packets are delivered in-sequence together with adoption of an appropriate retransmission scheme.

An end-to-end QoS architecture includes different QoS services and requirements within an entire network that includes radio access, mobile networks, and wire line core network parts. Different mechanisms are applied on each segment through the entire network by which to satisfy the overall QoS delivery. But, challenging aspects remain with respect to mechanisms by which to support QoS requirements at the radio interface portion of a communication network. And, particularly, a mechanism by which to address maintenance of error rates and delay times remains to be solved.

It is in light of this background information related to VoD communications in a radio communication system that the significant improvements of the present invention have evolved.

SUMMARY OF THE INVENTION

The present invention, accordingly, advantageously provides apparatus, and an associated method, by which to facilitate communication of frame-formatted data in a third-generation cellular, or other radio, communication system in which the data is to be communicated at a selected Quality of Service (QoS) level.

Through operation of an embodiment of the present invention, a manner is provided by which selectably to retransmit and to re-order data communicated at a selected Quality of Service level pursuant to effectuation of a data communication service.

Communication stations of the communication system are defined in terms of logical layers. The data retransmission and re-ordering is provided at a lower logical layer, such as at MAC (Medium Access Control) and physical (PHY or airlink) layers of the communication stations of the communication system.

Thereby, requests for retransmission of data, and the resultant retransmissions of the data, are made quickly. When frame errors are detected, request for retransmission of the affected frame is made without significantly increasing delay in communications. Thereby, also, re-ordering of data, received out-of-sequence is performed at the lower logical layer. And, the data, once re-ordered, is passed, in proper order, to a higher logical layer.

In one aspect of the present invention, advantage is taken of acceptable delay times permitted of data communicated pursuant to effectuation of a communication service. In a VoIP service, maximum delay times permitted of end-to-end communications, i.e., data source and data destination devices, is two hundred-fifty milliseconds (ms), and an average of a one percent data loss rate is permitted. A trade off is made between delay and error rate by which to permit selected retransmission of data to reduce the error rate without exceeding the allowable delay times of the communications. By providing for retransmission at the lower logical levels, the multiple retransmissions of data frames are effectuable without exceeding the maximum permitted delay. Retransmission of data at a higher logical layer, in contrast, would almost immediately exceed the permitted delay time. For instance, retransmission of data at an RLP (radio link protocol) layer would require a minimum delay of two hundred milliseconds. A delay period of this length essentially precludes higher-level retransmission of data.

HARQ (Hybrid-ARQ) is an acknowledgment-based, stop-and-wait ARQ protocol that is employed in the 1×EV-DV system, as presently-promulgated. HARQ is a link-adaptation technique that employs multiple instances and also uses a frame-combining technique, such as AAIR or chase combining, of original and retransmitted data to improve retransmission operation. HARQ is used at the link layer, such as the MAC (medium access control) layer, selectably to request retransmission of a data frame communicated during operation of the 1×EV-DV, or other appropriate, communication system to effectuate a VoIP communication service. The delay due to HARQ is proportional to the number of ARQ phases, the frame size of a data frame that is retransmitted, and the maximum number of retransmissions that are permitted. Through consideration of the QoS requirements and the HARQ specifications, a mechanism is provided by which to improve the error rate performance without exceeding allowable time delays during communication of the VoIP data. That is to say, a trade-off is made between delay and error rate in a manner to improve communication of the VoIP data.

In another aspect of the present invention, link layer signaling is performed to request a secondary service instance for VoIP and to signal the acceptable QoS parameters for a mobile station operable in the 1×EV-DV, or other appropriate, communication system. A signal is generated at the mobile station and communicated to the network part of the communication system. The signal requests the secondary service instance and values of the QoS parameters. These parameters include, for instance, QoS assured mode parameters on delay and data loss rate. The signal also includes an indication of the HARQ capability of the mobile station. The HARQ capability comprises, for instance the number of data retransmissions that are permitted and the minimum number of phases supported by the mobile station.

When the signal is received at the network part of the communication system, a determination is made whether to grant the secondary service instance with the requested QoS parameters. The determination is made, for instance, based upon the subscription service pursuant to which the mobile station is operable. The retransmission parameter allocations, if any, made responsive to the determination are returned to the mobile station in a signal that forms a secondary service instance response. Thereafter VoIP traffic data is communicated and frame retransmissions, when necessary, are performed according to the retransmission parameter allocations.

In another aspect of the present invention, the VoIP traffic data is communicated upon a non-synchronized channel, or is otherwise transmitted in a manner such that the packets are not necessarily received in sequence. Re-ordering is performed at the MAC, or other lower-logical, layer before the data is passed on to an upper logical layer.

Two variables are maintained at the MAC layer to facilitate re-ordering of the received data. A V(N) value is maintained that contains a buffer number of a next-subsequent data frame needed for sequential data delivery. And, a V(R) value is also maintained. The V(R) value contains the buffer number of the next new data frame that is expected. For each HARQ frame transmission, there is a frame indicator, indicating whether the frame is a new frame, i.e., a newly-transmitted frame, or a retransmitted frame, i.e., a retransmission of an earlier-transmitted frame. When a new frame is received, a phase number is assigned to the data frame, and the data is placed into a re-ordering buffer. Once the data frame has been decoded successfully, with or without combining, the data frame, together with other frames, which have been received, but out-of-sequence, are delivered to the higher logical layer.

Re-ordering of data frames received at a communication station at which multiple data services are active is also performed. In one implementation, a Service Reference Identification (SR_ID) is sent on a control channel. And, only frames with the same SR_ID value are provided to a particular re-ordering buffer. That is, the phase number is assigned only when the SR_ID value matches the VoIP service. If the SR_ID is not sent on the control channel, decoding of retransmitted frames must be performed to determine pursuant to which of the active data services that the data frame is sent.

Because frame retransmission and frame re-ordering is performed at the MAC layer, improved error rate performance is achieved while still complying with the time delay requirements of VoIP communication services.

In these and other aspects, therefore, apparatus, and an associated method, is provided for a radio communication system in which data is communicated pursuant to a Voice over Data (VoD) service. The communications utilize an ARQ scheme, and the radio communication system has a first communication station and a second communication station, and a service controller. Effectuation of the VoD service at a selected QoS (Quality of Service) level is facilitated where in the QoS level is, at least in part dependent upon an ARQ retransmission parameter. A service request is generated at the first communication station for a communication session during which to effectuate the VoD service at the selected QoS level. The service request includes an indication of an ARQ capability of the first communication station. The service request is delivered to the service controller. The service request is selectably granted at a designated QoS level. And, a response is returned to the first communication station. The response includes indications of an allocated ARQ retransmission parameter. The allocated ARQ retransmission parameter is determinative, at least in part, on whether the designated QoS level corresponds to the selected QoS level.

In these and other aspects, apparatus, and an associated method is also provided to a radio communication system in which data is communicated pursuant to a Voice over Data (VoD) service that uses an ARQ scheme. The data is communicated between a first communication station and a second communication station. The first communication station is defined in terms of a first logical layer and at least a second logical layer positioned there above. Effectuation of the VoD service at a selected Quality of Service (QoS) level is facilitated. The QoS level is, at least in part, dependent upon ordered delivery of data parts of the data communicated pursuant to the VoD service at the first communication station. Delivery of the data parts of the data sent during effectuation of the VoD service is detected. Each data part is identified by a sequencing indicator. Each data part of which delivery thereof is detected is buffered. When a next-sequential data part of the data is buffered, a determination is made whether the next-sequential data part is correctly received. If so, the next-sequential data part, and any previously-delivered data part delivered within a selected period is provided to the second logical layer.

A more complete appreciation of the present invention and the scope thereof can be obtained from the accompanying drawings that are briefly summarized below. The following descriptions of the presently-preferred embodiments of the invention, and the appended claims.

DETAILED DESCRIPTION

Figure 1:
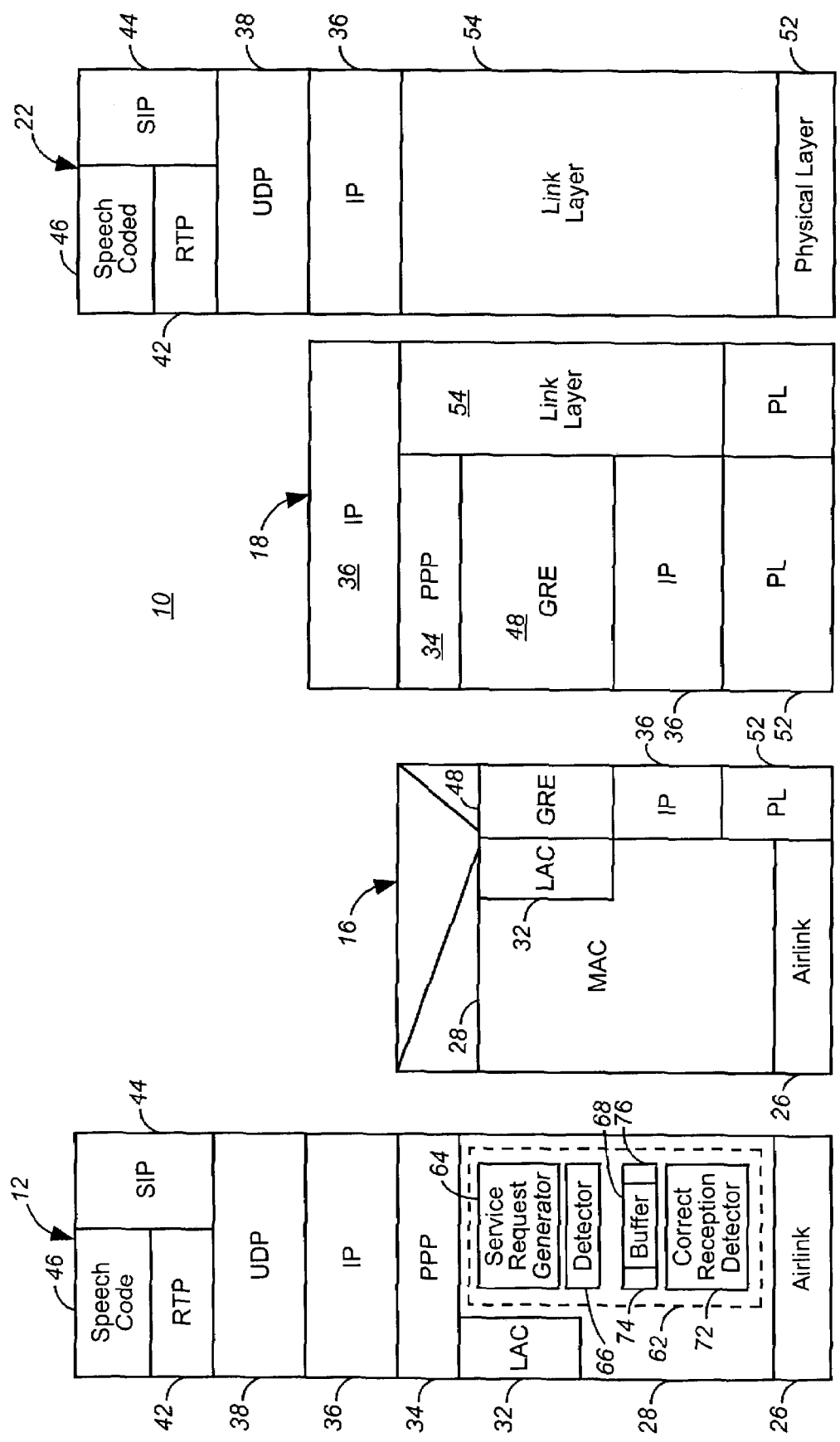
FIG. 1 illustrates a functional block diagram of an exemplary communication system, represented in terms of logical layers, in which an embodiment of the present invention is operable.

Referring first to FIG. 1, a communication system, shown generally at 10, is represented in terms of protocol stacks, that is, logical layers. The communication system here is representative of elements of a cellular communication system that provides for 1×EV-DV (1×Evolution for Data and Voice) data communications in a cdma (code-division, multiple-access) communication system. During operation of the communication system, data is communicated between separately-positioned communication stations to effectuate a communication service.

The communication system 10 is also representative of other types of communication systems, including cellular communication systems constructed pursuant to other communication standards. While the following detailed description shall describe operation of exemplary operation of an embodiment of the present with respect to implementation of the communication system 10 as a 1×EV-DV system that provides for VoIP (Voice over Internet Protocol) communication services, the teachings of the present invention are also applicable to other types of communication systems, including cellular communication systems constructed pursuant to other operating system specifications. And, the protocol view shown in the figure represents operation of the system by which to communicate VoIP traffic in the cdma2000 system that provides for 1×EV-DV data communications without the use of header compression components. When header compression is introduced, additional components in the protocol layer are required to fulfill requirements of an appropriate header compression specification.

The communication system 10 is here shown to include a network part capable of transceiving data with mobile stations, of which the mobile station 12 is representative. The network part includes a base transceiver station/base station controller/packet control function (BTS/BSC/PCF) entities 16 with which the mobile station 12 communicates by way of channels defined upon forward and reverse radio links, respectively, of the radio air interface.

The entities 16 are, in turn, coupled to a packet data service node (PDSN) 18. And, the node 18, in turn, is coupled to a correspondent node (CN) 22. The correspondent node here comprises, for instance, a VoIP-capable telephonic station that forms a data source, and a data destination, for VoIP data communicated pursuant to a communication session.

Each of the elements of the communication system is represented in terms of logical layers. The mobile station 12 is represented in terms of a protocol stack including an airlink layer 26, a MAC (Medium Access Control) layer 28, a LAC (Layer 2 transport protocol Access Concentrator) layer 32, a PPP (point-to-point) layer 34, an IP (Internet Protocol) layer 36, a UDP (User Datagram Protocol) layer 38, an RTP (Real-Time Transport Protocol) layer 42, an SIP (Session Initiation Protocol) layer 44, and a speech codec (coder-decoder) 46.

The BTS/BSC/PCF entities 16 are represented in terms of commonly-referenced layers. That is, the protocol stack of the entities 16 include an airlink layer 26, a MAC layer 28, and a LAC layer 32. The LAC layer, in turn, is positioned together with a GRE (Generic Route Encapsulation) layer 48. And, the GRE layer is positioned above an IP layer 36 that, in turn, is positioned above a physical layer (PL) 52.

The node 18 also is represented in terms of commonly-referenced layers, here, a physical layer 52, an IP layer 36, a GRE layer 48, a PPP layer 34, and an IP layer 36. The IP layer is positioned above a link layer 54, and the link layer is positioned above the PL 52.

And, the protocol stack of the correspondent node 22 is also represented in terms of commonly-referenced layers. That is, the correspondent node is here shown to include a physical layer 52, a link layer 54, an IP layer 36, a UDP layer 38, an RTP layer 42, a SIP layer 44, and a speech codec 46.

The MAC layer of the mobile station 12 is here also shown to include apparatus 62 of an embodiment of the present invention. The elements of the apparatus form functional entities, implementable in any desired manner, and are functionally represented in terms of the functions that are carried out by respective ones of the elements of which the apparatus is formed. Also, while forward-link operation of the system is described herein, corresponding apparatus for operation on the reverse link is also used, and corresponding apparatus also forms part of the MAC layer of the BTS/BSC/PCF entities 16.

The apparatus includes a service request generator 64 that operates to generate service requests, as shall be described below, with respect to a VoIP communication service. The service request is generated at the MAC level. The service request requests a secondary service instance for VoIP communications and indicates the acceptable QoS parameters for communications with the mobile station. When a response to the service request is returned to the mobile node, a detector detects the response together with allocations of the QoS parameters pursuant to which subsequent VoIP communications are to be effectuated.

When VoIP traffic data is communicated upon the forward link to the mobile station, a delivery detector 66 detects delivery of the frames of the data delivered to the mobile node. The frames are buffered at a buffer 68. CRC (cyclic redundancy code) checking is performed upon the received frames, here at a correct reception detector 72. And, various indicia associated with the frames are also detected, or maintained, at the mobile station. V(R) and V(N) values, the functions of which shall be noted below, are maintained, here buffered at buffer portions 74 and 76.

Figure 2:
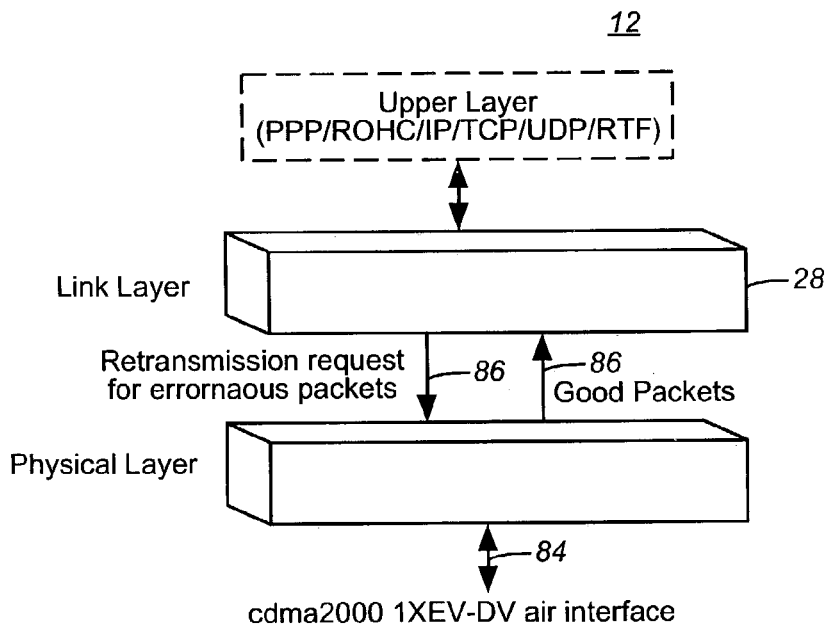
FIG. 2 illustrates a functional representation of a portion of the communication system shown in FIG. 1, here showing forward link operation of the portion of the communication system during effectuation of a VoIP communication service.

FIG. 2 again shows parts of the mobile station, here the link layer formed of the MAC layer 28 and the physical layer positioned there beneath. The VoIP path through the MAC component with HARQ (Hybrid ARQ) in the mobile station is shown. HARQ is a link-adaptation technique that is employed by the 1×EV-DV standard. HARQ employs multiple instances, i.e., so-called HARQ phases, of an acknowledgment-based, stop-and-wait ARQ protocol. HARQ uses a frame-combining technique, such as AAIR or Chase combining on original and retransmitted packets to improve the retransmission operation. And, HARQ is thereby a scheme that provides flexibility to fulfill tradeoffs between delay and frame quality.

VoIP data frames are delivered by way of the cdma2000 1×EV-DV air interface at the physical layer, as indicated by the arrow 84. Good packets are provided to the MAC layer 28, as indicated by the arrow 86. And, retransmission requests for the erroneous packets are delivered, here indicated by the arrow 88, back to the physical layer. Because retransmissions are requested, and effectuated at the lower-logical layers, time constraints imposed by maximum time delays are of lessened significance as the retransmissions are effectuated much more quickly than would be possible at higher logical layers.

The delay due to HARQ is proportional to the number of ARQ phases (NARQP), the frame size (TTI) that is being transmitted, and the number of maximum retransmissions (MAXRETRANS). For instance, when the number of ARQ phases equal four, a frame size of 5 milliseconds, and the maximum number of retransmissions is four, the maximum delay is about 80 milliseconds, that is, (four times four times five) ms. The maximum delay of this example is acceptable, well beneath a radio delay budget, e.g., of 150 ms.

Figure 3:
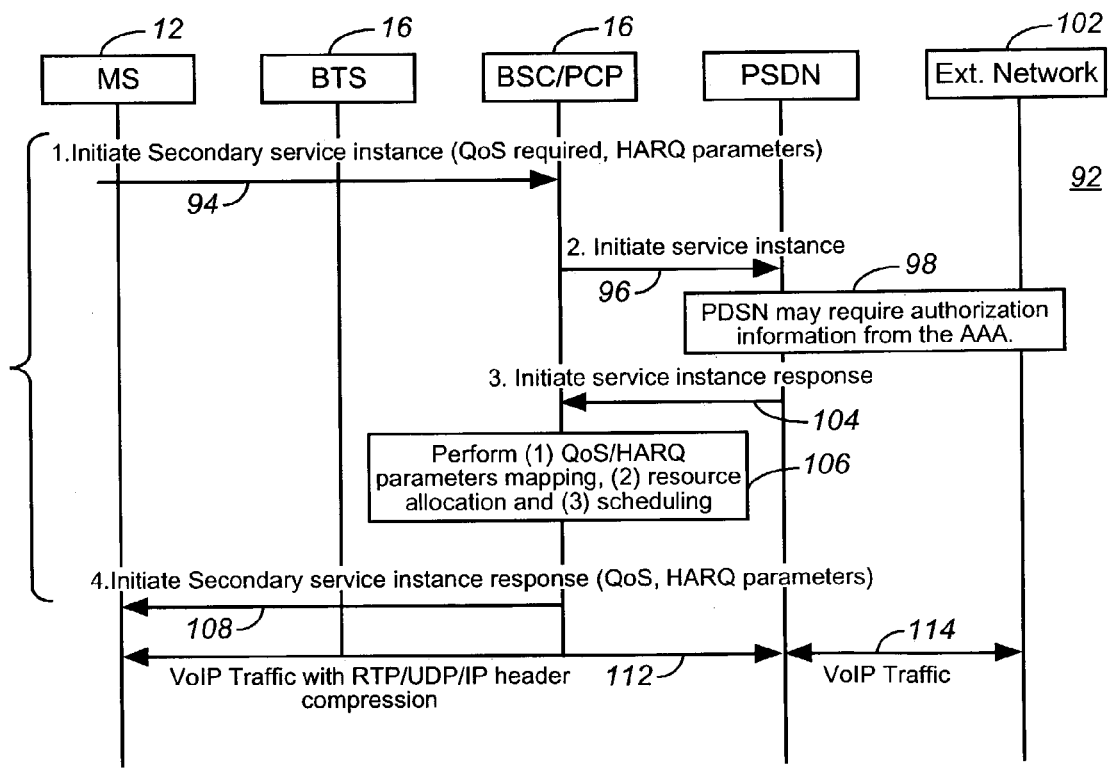
FIG. 3 illustrates a message sequence diagram showing signaling generated during operation of a QoS signaling procedure pursuant to an embodiment of the present invention.

FIG. 3 illustrates a message sequence diagram, shown generally at 92, that represents the procedures by which the mobile station utilizes link layer signaling to request a second service instance. The request is sent, as indicated by the segment 94, by the mobile station 12 to the BTS/BSC/PCF entities 16. The request is a request to initiate a second service instance for VoIP and includes indications of the acceptable QoS parameters for the mobile station, here the required QoS and the HARQ parameters are requested. That is, the QoS parameters consist of the QoS-assured mode parameters on delay and data loss rate. And, the mobile station indicates its HARQ capability such as the maximum number of retransmissions that are permitted and the minimum number of phases that are supported.

The request is forwarded, as indicated by the segment 96, to the PDSN. The PDSN attempts authorization, here indicated by the block 98, of the request from the AAA entity, represented to form a portion of an external network 102. The AAA provides the QoS policy of the subscription pursuant to which the mobile station is operable to the PDSN. In turn, the PDSN routes, as indicated by the segment 104, the allowed QoS parameters to the entities 16. As indicated by the block 106, QoS/HARQ mapping operations, resource allocation, and rescheduling operations are performed.

Then, and as indicated by the segment 108, an initiate second service instance response is sent back to the mobile station. The response includes the retransmission parameter values in the response. Thereafter, and as indicated by the segments 112 and 114, the VoIP traffic is communicated. As indicated, at the air interface, the RTP/UDP/IP headers are compressed.

An exemplary mapping scenario is set forth in the following table that shows mapping between QoS parameters and HARQ parameters. The base station, or other network entity performs the mapping during service initiation. Here, the current cell load or base station scheduling decides the delay or jitter, while the data loss rate is related to the link condition.

| TTI | MAXRETRANS | NARQP | Radio Delay | Data Loss Rate |
|---|---|---|---|---|
| 1.25 ms | 4 | 4 | <20 ms | <1% FER |
| 2.5 ms | 4 | 4 | <40 ms | <1% |
| 5 ms | 4 | 4 | <80 ms | <1% |

Also as noted previously, out-of-order delivery has an impact on the compression efficiency, and out-of-order delivery should be minimized to maintain voice quality of VoIP communications. RTP/UDP/IP header compression, however, is required for VoIP over a wireless radio link to achieve improved levels of spectrum efficiency.

RTP header de-compressor for VoIP requires frames to be delivered in sequence, and for this purpose, there can be two distinct possibilities of the radio bearer. That is, the radio bearer is either a synchronized radio bearer channel or is a non-synchronized bearer channel. On a non-synchronized channel, VoIP frames are not necessarily received in order. And, through the use of HARQ or other-ARQ (OAQ) schemes, each packet goes through its own retransmission in its ARQ 'phase.' And, the MAC layer does not necessarily receive data packets in proper order. As VoIP is PPP-free, and the packets do not include RLP overhead, the higher logical layers do not have a manner by which to re-sequence the packets prior to delivery to the RTP-layer header de-compressor. Pursuant to operation of an embodiment of the present invention, 'good' packets are re-ordered prior to being passed on to an upper layer.

Pursuant to operation of an embodiment of the present invention, re-ordering of packet data is performed at the MAC layer of a receiving station, for instance, the mobile station 12 at which VoIP data is received. Two variables are maintained at the MAC layer to facilitate such re-ordering. Namely, values of variables V(N) and V(R) are maintained at the MAC layer. V(N) contains the buffer number of a next-subsequent data frame needed for sequential delivery of data frames. And, V(R) contains the buffer number of the next new data frame expected. For each HARQ frame transmission, there is a frame indicator of either NEW or RETRANSMITTED for HARQ operation. Whenever a new frame is received, the phase number is assigned to the data frame, and the data is placed in a re-ordering buffer. And, once the data frame is decoded successfully, with or without combining operations performed upon retransmitted frames, the data frame, together with other frames that have been received, but out of sequence, are delivered to a higher logical layer of the communication station.

Figure 4:
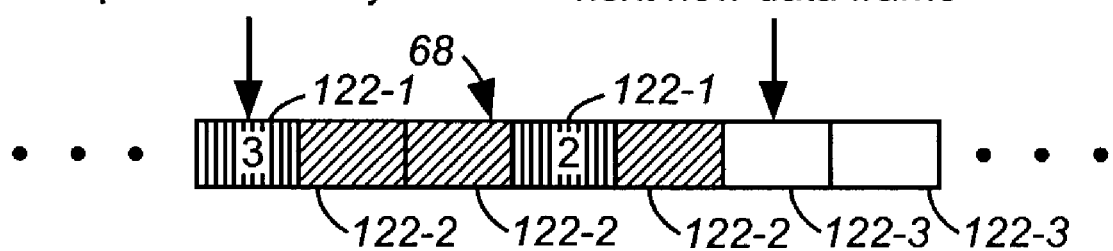
FIG. 4 illustrates a functional representation of an exemplary re-ordering procedure performed pursuant to operation of an embodiment of the present invention.

FIG. 4 illustrates an exemplary scenario of operation of an embodiment of the present invention by which data-frame re-ordering is performed at the MAC layer of a communication station at which the VoIP data is received. The buffer 68 forming a portion of the apparatus 62 of an embodiment of the present invention is again shown. And, successive frames 122 of data are buffered thereat. Frame locations 122-1 represent buffer space maintained for missing frames. Frames 122-2 are representative of data frames that have been delivered, and buffered, out of sequence. And, frame locations 122-3 are representative of buffer space available for subsequently-delivered frames. The variables V(N) and V(R) are also shown in the Figure. Here the receiving station formed of the mobile station has requested for the data frame retransmission from V(N)=three, and it has received data frames from other phases out of sequence. If the retransmission of the data frame from V(N) is completed successfully, frame V(N) and the following consecutive frames are passed up to a higher logical layer. If the retransmission is abandoned by the sending station that sends the VoIP data frames, all of the data frames queued sequentially after V(N) are also passed up to the higher logical layer, i.e., to a de-compressor. To ensure continuous delivery of VoIP packets, the receiving station, in one implementation utilizes a timer to set up a maximum time permitted for waiting for a retransmitted frame.

Figure 5:
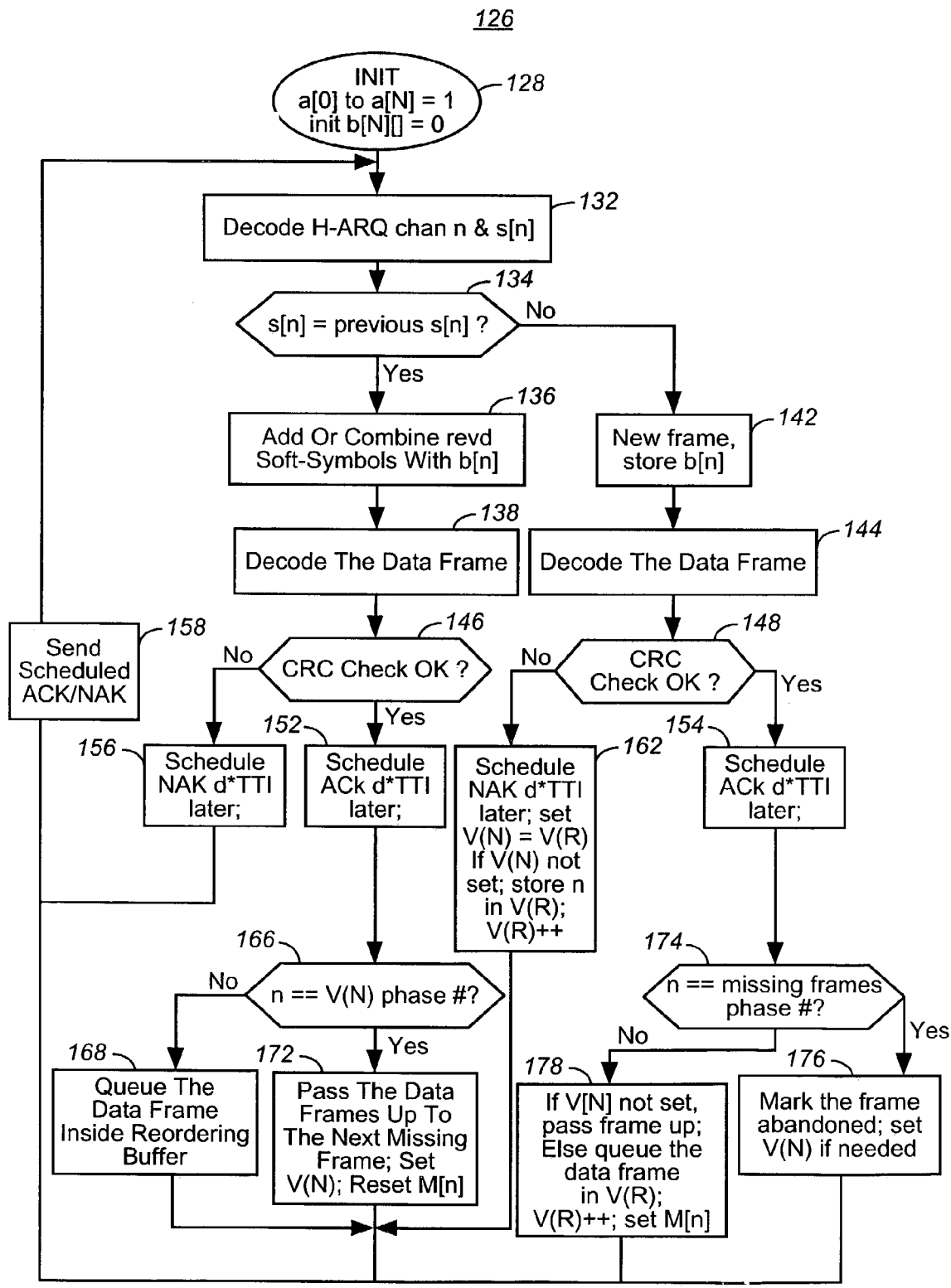
FIG. 5 illustrates a flow chart representative of the procedure by which selectably to re-order data frames communicated during operation of the communication system shown in FIG. 1.

FIG. 5 illustrates a flow chart, shown generally at 126, that describes exemplary operation of an embodiment of the present invention by which to re-order out-of-sequence data received during operation of the communication system shown in FIG. 1. The receiving station, for example, the mobile station 12, sequences through the operations set forth in the flow chart every TTI milliseconds. The following data structures are defined: n=current H-ARQ channel; V(N) =phase number of the next data frame needed for sequential deliver; Boolean M[N]=Boolean indicates the frame is retransmitted for this phase; int s[N]=one-bit H-ARQ channel sequence number, initialized to '1'. And, float b[N] [interleaver Size]=H-ARQ channel soft-symbol buffer (initialized to '0')

Initialization of the various parameters is indicated at the INIT block 128. Then, at block 132, the H-ARQ channel n and the associated sequence number s are decoded. Thereafter, and as indicated at the decision block 134, a determination is made whether the H-ARQ channel sequence number s(n) is the same as the previous transmission, and the frame was not passed to an upper logical layer. If so, the yes branch is taken to the block 136, and the received soft-symbols are added together with the soft symbols stored in b(n). And, as indicated by the block 138, the data frame is decoded.

If the no branch is taken from the decision block 134, a path is taken to the block 142, and the new frame is stored in b(n). And, as indicated by the block 144, the data frame is decoded. Paths are taken from the blocks 138 and 144 to respective decision blocks 146 and 148. At the decision blocks 146 and 148, CRC checks are performed, and determinations are made as to whether the CRC checks are success. At the decision block 146, if so, the yes branch is taken to the block 152. And, at the decision block 148, if so, the yes branch is taken to the block 154. At the respective blocks 152 and 154, ACK='1' acknowledgments are scheduled on the control channel TTI ms frames later. If the no branch is taken from the decision block 146, a path is taken to the block 156, the decoded frame is discarded, and the ACK='0' (i.e., NAK) is scheduled TTI ms later. And, a path is taken to the block 158 whereat the scheduled ACK or NAK is sent. If the no branch is taken from the decision block 148, a path is taken to the block 162, and the NAK is scheduled TTI ms later. Also, V(N) is set to equal V(R) if V(N) is not set. And, n is stored in V(R) and V(R)++, and a path is taken to the block 158.

From the block 152, a path is taken to the decision block 166 and a determination is made as to whether n equals V(N). If so, the yes branch is taken to the block 168. At the block 168, the frames from V(N) up to the next missing frame, including abandoned frames, are passed to the higher logical layer, i.e., the de-compressor. V(N) is set to the buffer number of the data frame needed for sequential delivery or V(N) is reset if no frame is missing. And, M[n] is reset. If the no branch is taken from the decision block 166, a path is taken to block 172 at which the frame is queued in the re-ordering buffer. Paths are taken from the blocks 168 and 172 to the block 158.

From the block 154, a path is taken to the decision block 174. A determination is made thereat as to whether n equals one of the missing frame phase numbers m[N]. If so, the yes branch is taken to the block 176, and the missing frame is marked in the re-ordering buffer as abandoned. V(N) is set, also, if needed, to the buffer number of the data frame needed for sequential delivery. If the no branch is taken from the decision block 174, a path is taken to the block 178. If V(N) is not set, the frame is passed to the upper logical layer. If V(N) is set, the frame is queued in the re-ordering buffer and V(R) is advanced.

In one implementation, multiple data services are active at the mobile station. The control procedures to effectuate data re-ordering are modified as the data frames in the HARQ are not destined for the same VoIP service. If the SR_ID, i.e., the Service Reference ID, is sent on the control channel, the re-ordering buffer is created for only the frames with the same SR_ID values. This means that the phase number is assigned only when the SR_ID value matches the VoIP service. If the SR_ID information is not sent on the control channel, then a determination can not be made if a missing frame is for the VoIP service only after the retransmitted frame is correctly decoded.

In this implementation, the decision determination at the decision block 166 is modified. The yes branch is taken to the block 172 further if the service reference ID does not equal the value of the SR_ID. And, correspondingly, the block 178 is also modified. Here, the frame is passed up also if the service reference ID does not equal the value of the SR_ID.

Thereby, a manner is provided by which to re-order data delivered to a receiving station at the MAC layer, both when a single data instance is present and when multiple data instances are present at the mobile station. Also, as retransmissions of data are effectuated at the MAC layer, delay times associated with retransmission of data are maintained within acceptable levels.

The previous descriptions are of preferred examples for implementing the invention, and the scope of the invention should not necessarily be limited by this description. The scope of the present invention is defined by the following claims:

We claim:

1. In a method of communicating data pursuant to a Voice over Data (VoD) service that uses an ARQ scheme in a radio communication system having a first communication station and a second communication station, the first communication station being defined in terms of a first logical layer and at least a second logical layer positioned thereabove, the radio communication system having a service controller, an improvement of a method for facilitating effectuation of the VoD service at a selected Quality of Service (QoS) level, the QoS level, at least in part, dependent upon an ARQ retransmission parameter, and ordered delivery of data parts of the data communicated pursuant to the VoD service to the first communication station, said method comprising:

generating a service request at the first communication station for a communication session during which to effectuate the VoD service at the selected QoS level, the service request including an indication of an ARQ capability of the first communication station;

delivering the service request to the service controller;

receiving a response at the first communication station, the response including indications of an allocated ARQ retransmission parameter, the allocated ARQ retransmission parameter determinative, at least in part, on whether a designated QoS level at which the service request was granted corresponds to the selected QoS level;

detecting delivery at the first logical layer of the first communication station of the data parts of the data sent during effectuation of the VoD service, each data part identified by a sequencing indicator;

buffering each data part of which delivery thereof is detected during said operation of detecting delivery;

when a next-sequential data part of the data is buffered during said operation of buffering, determining whether the next-sequential data part is correctly received, and, if so;

providing the next-sequential data part, and any previously-delivered data part buffered during said operation of buffering within a selected period, to the second logical layer; and maintaining a first buffer index value, the first buffer index value indicating a value of a next-sequential data part and wherein said operation of determining comprises comparing the sequencing indicator by which a data part is identified together with the first buffer index value.

2. The method of claim 1 further comprising the operation of maintaining a second buffer index value, the second buffer index value indicating a value of the sequencing indicator associated with a data part of which delivery thereof is detected during said operation of delivering.

3. The method of claim 1 wherein the Voice over Data (VoD) service comprises a first Voice over Data service and a second Voice over Data service, data parts communicated pursuant to the first VoD service identified by a first reference identifier and data parts communicated pursuant to the second VoD identified by a second reference identifier, and wherein said operation of determining further comprises determining with which of the first and second VoD services that the next-sequential data part is associated.

4. The method of claim 3 further comprising the operation of sending a service reference indicator of a value indicative of which of the first and second VoD services that data parts of which are to be buffered during said operation of buffering.

5. The method of claim 1 wherein the indication of the ARQ capability of the first communication station included in the service request generated during said operation of generating comprises a value representative of a number of data-part retransmissions that are requested to be permitted during communication of the data.

6. The method of claim 1 wherein the radio communication system comprises a mobile radio communication system wherein the first communication station comprises a mobile station, wherein the second communication station comprises a radio base station forming part of a network of the radio communication system, wherein the service controller comprises a network-positioned entity, and wherein the service request delivered during said operation of delivering is delivered to the network-positioned entity by way of the radio base station.

7. In a method of communicating data pursuant-to a Voice over Data (VoD) service that uses an ARQ scheme between a first communication station and a second communication station of a radio communication system, the first communication station defined in terms of a first logical layer and at least a second logical layer positioned thereabove, an improvement of a method for facilitating effectuation of the VoD service at a selected Quality of Service (QoS) level, the QoS level, at least in part, dependent upon ordered delivery of data parts of the data communicated pursuant to the VoD service at the first communication station, said method further comprising:

detecting delivery at the first logical layer of the first communication station of the data parts of the data sent during effectuation of the VoD service, each data part identified by a sequencing indicator;

buffering each data part of which delivery thereof is detected during said operation of detecting delivery;

when a next-sequential data part of the data is buffered during said operation of buffering, determining whether the next-sequential data part is correctly received, and, if so;

providing the next-sequential data part, and any previously-delivered data part buffered during said operation of buffering within a selected period, to the second logical layer; and maintaining a first buffer index value, the first buffer index value indicating a value of a next-sequential data part and wherein said operation of determining comprises comparing the sequencing indicator by which a data part is identified together with the first buffer index value.

8. The method of claim 7 wherein the Voice over Data (VoD) service comprises a first Voice over Data service and a second Voice over Data service, data parts communicated pursuant to the first VoD service identified by a first reference identifier and data parts communicated pursuant to the second VoD identified by a second reference identifier, and wherein said operation of determining further comprises determining with which of the first and second VoD services that the next-sequential data part is associated.

9. In a radio communication system having a first communication station and a second communication station, the first communication station being defined in term.s of a first logical layer and at least a second logical layer positioned thereabove, the radio communication system including network infrastructure operable to conmninicate data pursuant to a Voice over Data (VoD) service that uses an ARQ scheme, an improvement of apparatus for facilitating effectuation of the VoD service at a selected Quality of Service (QoS) level, at least in part, dependent upon an ARQ retransmission parameter, and ordered delivery of data paffs of the data communicated pursuant to the VoD service to the first communication station, said apparatus comprising:

a service request generator positioned at the first communication station, said service request generator for generating a service request to request a communication session during which to effectuate the VoD service at the selected QoS level, the service request including an indication of an ARQ capability of the first communication station;

a delivery detector embodied at the first logical layer of the first communication station, said delivery detector for detecting delivery of at the first logical layer of the data parts of the data sent during effectuation of the VoD service, each data part identified by a sequencing indicator;

a buffer coupled to said delivery detector, said buffer for buffering each data part of which delivery thereof is detected by said delivery detector; and a correct-reception determiner coupled to said buffer, said correct-reception determiner for determining whether the next-sequential data part is correctly received, and, if so, for providing the next-sequential data part, and any previously-delivered data part buffered during said operation of buffering within a selected period, to the second logical layer, wherein said buffer further maintains a first buffer index value, the first buffer index value indicating a value of a next-sequential data part and wherein said correct-reception determiner compares the sequencing indicator by which a data part is identified together with the first buffer index value.

10. The apparatus of claim 9 wherein said buffer further maintains a second buffer index value, the second buffer index value indicating a value of the sequencing indicator associated with a data part of which delivery thereof is detected by said delivery detector.

11. The apparatus of claim 9 wherein the Voice over Data (VoD) service comprises a first Voice over Data (VoD) service and a second Voice over Data (VoD) service, data parts communicated pursuant to the first VoD service identified by a first reference identifier and data parts communicated pursuant to the second VoD service identified by a second reference identifier, and wherein said correct-reception determiner further determines with which of the first and second VoD services that the next-sequential data part is associated.

12. The apparatus of claim 9 further comprising a service request allocator coupled to the second communication station, said service request allocator for selectably granting the service request at a designated QoS level.

13. The apparatus of claim 12 wherein said service request allocator further causes return of a response to the first communication station, the response including indications of an allocated ARQ retransmission parameter, the allocated ARQ retransmission parameter determinative of, at least in part, on whether the designated QoS level corresponds to the selected QoS level.

14. The apparatus of claim 13 wherein the radio communication system comprises a mobile radio communication system wherein the first communication station comprises a mobile station, wherein the second communication station comprises a radio base station forming part of a network of the radio communication system, wherein the service controller comprises a network-positioned entity, and wherein the service request allocator is embodied at the service controller.

15. In a radio communication system that communicates data pursuant to a Voice over Data (VoD) service that uses an ARQ scheme between a first communication station and a second communication station of a radio communication system, the first communication station defined in terms of a first logical layer and at least a second logical layer positioned thereabove, an improvement of apparatus for facilitating effectuation of the VoD service at a selected Quality of Service (QoS) level, the QoS level, at least in part, dependent upon ordered delivery of data parts of the data communicated pursuant to the VoD service at the first communication station, said apparatus comprising:

a delivery detector embodied at the first logical layer of the first communication station, said delivery detector for detecting delivery of at the first logical layer of the data parts of the data sent during effectuation of the VoD service, each data part identified by a sequencing indicator;

a buffer coupled to said delivery detector, said buffer for buffering each data part of which delivery thereof is detected by said delivery detector; and a correct-reception determiner coupled to said buffer, said correct-reception determiner for determining whether the next-sequential data part is correctly received, and, if so, for providing the next-sequential data part, and any previously-delivered data part buffered during said operation of buffering within a selected period, to the second logical layer, wherein said buffer further maintains a first buffer index value, the first buffer index value indicating a value of a next-sequential data part and wherein said correct-reception determiner compares the sequencing indicator by which a data part is identified together with the first buffer index value.

16. The apparatus of claim 15 wherein the Voice over Data (VoD) service comprises a first Voice over Data (VoD) service and a second Voice over Data (VoD) service, data parts communicated pursuant to the first VoD service identified by a first reference identifier and data parts communicated pursuant to the second VoD service identified by a second reference identifier, and wherein said correct-reception determiner further determines with which of the first and second VoD services that the next-sequential data part is associated.

* * * * *

UNITED STATES PATENT AND TRADEMARK OFFICE
CERTIFICATE OF CORRECTION

PATENT NO. : 7,272,113 B2
APPLICATION NO. : 10/308921
DATED : September 18, 2007
INVENTOR(S) : Cheng et al.

It is certified that error appears in the above-identified patent and that said Letters Patent is hereby corrected as shown below:

<u>Column 14,</u>

Line 36, "term.s" should read --terms--;

Line 39, "conmninicate" should read --communicate--;

Line 44, "paffs" should read --parts--.

Signed and Sealed this

Eighteenth Day of December, 2007

JON W. DUDAS
*Director of the United States Patent and Trademark Office*